United States Patent [19]

Shirai et al.

[11] Patent Number: 5,182,762
[45] Date of Patent: Jan. 26, 1993

[54] MODEM HAVING SPEED NOTIFYING MEANS

[75] Inventors: Nobuo Shirai, Hino; Takami Kasasaku, Tokyo, both of Japan

[73] Assignee: Fujitsu Limited, Japan

[21] Appl. No.: 648,999

[22] Filed: Jan. 31, 1991

[30] Foreign Application Priority Data

Jan. 31, 1990 [JP] Japan .................................. 2-18885

[51] Int. Cl.[5] .............................................. H04B 1/66
[52] U.S. Cl. ......................................... 375/122; 375/8; 358/432; 370/7; 455/72; 381/29; 381/31
[58] Field of Search ........................... 375/8, 88, 122; 358/426, 432; 370/7, 118; 371/5.5; 455/72; 381/31, 29

[56] References Cited

U.S. PATENT DOCUMENTS

| | | | |
|---|---|---|---|
| 3,813,485 | 5/1974 | Arps | 375/122 |
| 4,124,773 | 11/1978 | Elkins | 381/31 |
| 4,385,392 | 5/1983 | Angell et al. | 375/8 |
| 4,562,571 | 12/1985 | Deman et al. | 375/122 |
| 4,651,221 | 3/1987 | Yamaguchi | 358/432 |
| 4,755,994 | 7/1988 | Staples et al. | 375/122 |

OTHER PUBLICATIONS

The Reference Manual for "QX/3296c Error-Correcting Modem" manufactured by Microcom, cover page and p. 42.
The User Manual for "MD2400F Intelligent Modem" manufactured by Omron, cover page and pp. 130-133 (no translation).

Primary Examiner—Curtis Kuntz
Assistant Examiner—Young Tse
Attorney, Agent, or Firm—Staas & Halsey

[57] ABSTRACT

A modem is connected to a terminal equipment and couples to another modem via a transmission line. The modem includes a data transmission and reception part for making data transmission and reception with the terminal equipment, and a modem part for determining a modulation technique, for modulating a transmission signal from the other modem. In addition, the modem includes a data compression and decompression part for determining a compression technique. The compression technique is used for compressing serial data from the data transmission and reception part before supplying the same to the modem part and for decompressing the compressed serial data from the modem part before supplying the same to the data transmission and reception part. The modem further includes a speed determining part, notified of a communication speed between the modem and the other modem determined from the modulation technique and a compression rate of the data compression technique for determining an optimum communication speed when the connection between the two modems is established. In addition, the modulation technique is determined and the data compression technique is determined, in response to outputs of the modem part and data compression and decompression part. The speed determining part notifies the data transmission and reception part of the optimum communication speed, and the data transmission and reception part makes data transmission and reception with the terminal equipment using the optimum communication speed.

8 Claims, 6 Drawing Sheets

MODEM HAVING SPEED NOTIFYING MEANS

CROSS-REFERENCE TO RELATED APPLICATION

The present application relates to co-pending application Ser. No. 07/584,147, filed Sep. 18, 1990 of Fujimoto et al., entitled "Packet Communication System Using A Telephone".

BACKGROUND OF THE INVENTION

The present invention generally relates to modems, and more particularly to a modem which has a speed notifying means and a data compression function so as to optimize the communication speed between modems.

In data communication using a telephone switching network which has a limit to the communication speed between modems, there is an increasing demand to further improve the communication speed due to the popular use of terminal equipment such as personal computers which make data communication via the telephone switching network.

As one method of meeting the above demand, there is a proposed modem which has a data compression function and modulating and demodulating functions. In other words, the proposed modem compresses the data transmitted from the terminal equipment and improves the effective throughput of the data communication between the terminal equipment to several times the communication speed which is determined by the modulation technique used between the modems. The value which is multiplied by the communication speed is referred to as a compression rate.

In the case of the communication between the terminal equipment using the modems described above, the communication speed between the terminal equipment and the modem can in principle be increased to a value which is a product of the compression rate and the speed determined by the modulation technique used between the modems or greater. As a result, it becomes possible to effectively utilize the effects of the data compression function of the modems, and the realization of such a system is awaited.

Figure 1:
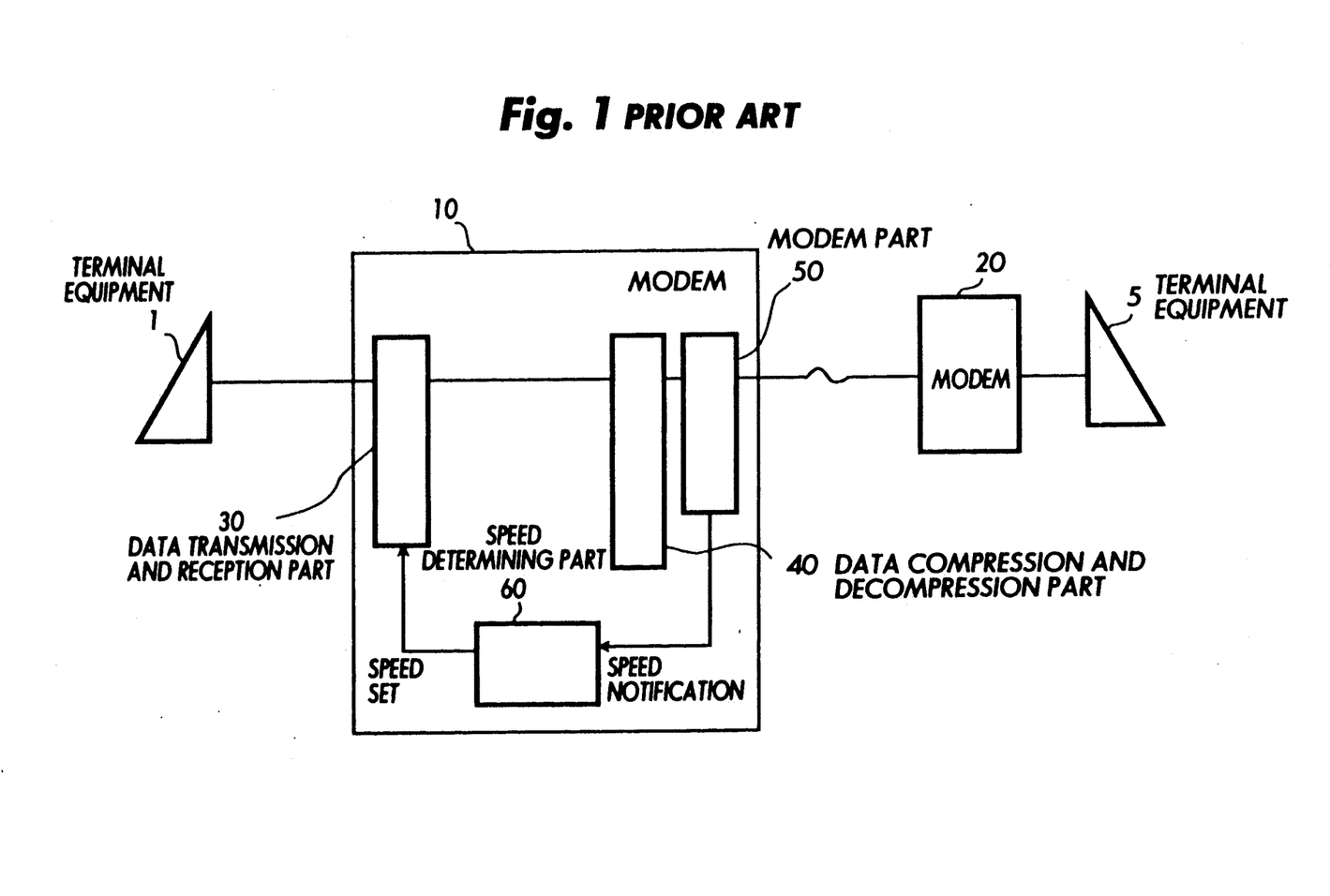

FIG.1 shows an example of a conventional modem together with associated terminal equipment and the like. In FIG.1, modems 10 and 20 are coupled via a transmission line, and a terminal equipment 1 is coupled to the modem 10 while a terminal equipment 5 is coupled to the modem 20. For the sake of convenience, only the construction of the modem 10 is shown and described because the construction of the modem 20 is the same as that of the modem 10.

The modem 10 includes a data transmission and reception part 30, a data compression and decompression part 40, a modem part 50, and a speed determining part 60. The data transmission and reception part 30 performs data transmission and reception between the modem 10 and the terminal equipment 1. The modem part 50 modulates a transmission signal with a predetermined modulation technique before transmitting the same to the modem 20, and demodulates a reception signal which is received from the modem 20. The data compression and decompression part 40 is provided between the data transmission and reception part 30 and the modem part 50. The data compression and decompression part 40 compresses the data from the data transmission and reception part 30 at a predetermined compression rate before supplying the same to the modem part 50, and decompresses the compressed data from the modem part 50 before supplying the same to the data transmission and reception part 30. The speed determining part 60 is notified of the speed of the reception signal from the modem part 50 and sets the communication speed between the data transmission and reception part 30 and the terminal equipment 1.

Hence, the modem 10 notifies the terminal equipment 1 of the communication speed which is determined by the modulation technique used between the modems 10 and 20, regardless of the data compression technique which is determined when the modems 10 and 20 are connected. In this case, when the communication speed of the terminal equipment 1 is assumed to be the communication speed which is notified from the modem 10, the terminal equipments 1 and 5 communicate at the communication speed which is determined by the modulation technique used between the modems 10 and 20, and it is impossible to bring out the effects obtainable based on the data compression function of the modem 10.

In order to bring out the effects of the data compression function of the modem 10 in FIG.1, the communication speed between the terminal equipment 1 and the modem 10 must be set in advance to a fixed value which is greater than or equal to a specific value. This specific value is a product of the communication speed between the modems 10 and 20 which is determined by the predicted modulation technique used between the modems 10 and 20 and the data compression rate which is determined by the predicted data compression technique used between the modems 10 and 20.

According to the conventional system shown in FIG.1, it is impossible to obtain the effects of the data compression even though the modems 10 and 20 have the data compression function if the terminal equipment 1 and 5 are designed to merely determine the communication speed between the respective modems 10 and 20 depending on the communication speed notified from the respective modems 10 and 20.

As described above, in order for the terminal equipment to effectively utilize the built-in data compression function of the modem when making the communication through the modem, the communication speed between the terminal equipment and the modem must be fixed in advance to a speed which takes into account the predicted effects of the data compression.

On the other hand, there is a proposed modem which notifies the terminal equipment of the communication speed which is established by the handshaking between the modems when the modems are connected, and thereafter changes the communication speed between the modem and the terminal equipment to the notified communication speed. For example, a modem employing the AT command proposed by Hayes Microcomputer Products, Inc. of the United States is such a proposed modem. By the appearance of such a proposed modem, there are now proposed systems in which the terminal equipment has the functions of changing the communication speed between the terminal equipment and the modem to the communication speed which is notified from the modem and thereafter making the data communication between the terminal equipment and the modem.

However, even when the terminal equipment which determines the communication speed between the terminal equipment and the modem depending on the communication speed notified from the modem is simply connected to the modem which has the built-in data compression function, it is impossible to bring out the effects of the data compression.

SUMMARY OF THE INVENTION

Accordingly, it is a general object of the present invention to provide a novel and useful modem in which the problems described above are eliminated.

Another and more specific object of the present invention is to provide a modem which is connected to a terminal equipment and couples to an other modem via a transmission line, comprising data transmission and reception means coupled to the terminal equipment for making data transmission and reception with the terminal equipment, modem means coupled to the transmission line for modulating a transmission signal with a predetermined modulation technique before transmitting the same to the other modem and for demodulating a reception signal which is received from the other modem, data compression and decompression means coupled between the data transmission and reception means and the modem means for compressing serial data from the data transmission and reception means at a predetermined compression rate before supplying the same to the modem means and for decompressing the compressed serial data from the modem means before supplying the same to the data transmission and reception means, and speed determining means, notified of a communication speed between the two modems determined from the modulation technique as well as a compression rate determined from a data compression technique of the data compression and decompression means, for determining an optimum communication speed when the connection between the two modems is established, the modulation technique in the modem means is determined and the data compression technique of the data compression and decompression means is determined, in response to outputs of the modem means and the data compression and decompression means, where the speed determining means notifies the data transmission and reception means of the optimum communication speed and the data transmission and reception means makes data transmission and reception with the terminal equipment in the optimum communication speed. According to the modem of the present invention, it is possible to bring out effects of the data compression with respect to the terminal equipment which determines the communication speed between the terminal equipment and the modem depending on the communication speed notified from the modem.

Still another object of the present invention is to provide the modem of the type described above wherein the data transmission and reception means makes data transmission and reception with the terminal equipment in the optimum communication speed which is determined based on the modulation technique used between the two modems when no data compression is made in the data compression and decompression means.

A further object of the present invention is to provide the modem of the type first described, wherein the data transmission and reception means makes data transmission and reception with the terminal equipment in the optimum communication speed which is determined based on the data compression technique and is greater than or equal to a maximum throughput between two terminal equipments coupled via the transmission line when data compression is made in the data compression and decompression means.

Another object of the present invention is to provide the modem of the type first described, which further comprises selecting means coupled to the data transmission and reception means and the data compression and decompression means for selecting a mode of the speed determining means to one of first and second modes, where the speed determining means in the first mode notifies the data transmission and reception means of the communication speed which is determined based on the modulation technique used between the two modems in either case that no data compression is made or that data compression is made in the data compression and decompression means, and the speed determining means in the second mode notifies the data transmission and reception means of the communication speed which is determined based on the data compression technique and is greater than or equal to a maximum throughput between two terminal equipments coupled via the transmission line when data compression is made in the data compression and decompression means. According to the modem of the present invention, it is possible to prevent the communication speed between the terminal equipment and the modem from being changed to a communication speed which exceeds the communication capacity of the terminal equipment when the terminal equipment has a limited operation speed even if the data compression is made.

Other objects and further features of the present invention will be apparent from the following detailed description when read in conjunction with the accompanying drawings.

BRIEF DESCRIPTION OF THE DRAWINGS

FIG. 1 is a system block diagram showing an example of a conventional modem together with associated terminal equipments and the like;

DESCRIPTION OF THE PREFERRED EMBODIMENTS

Figure 2:
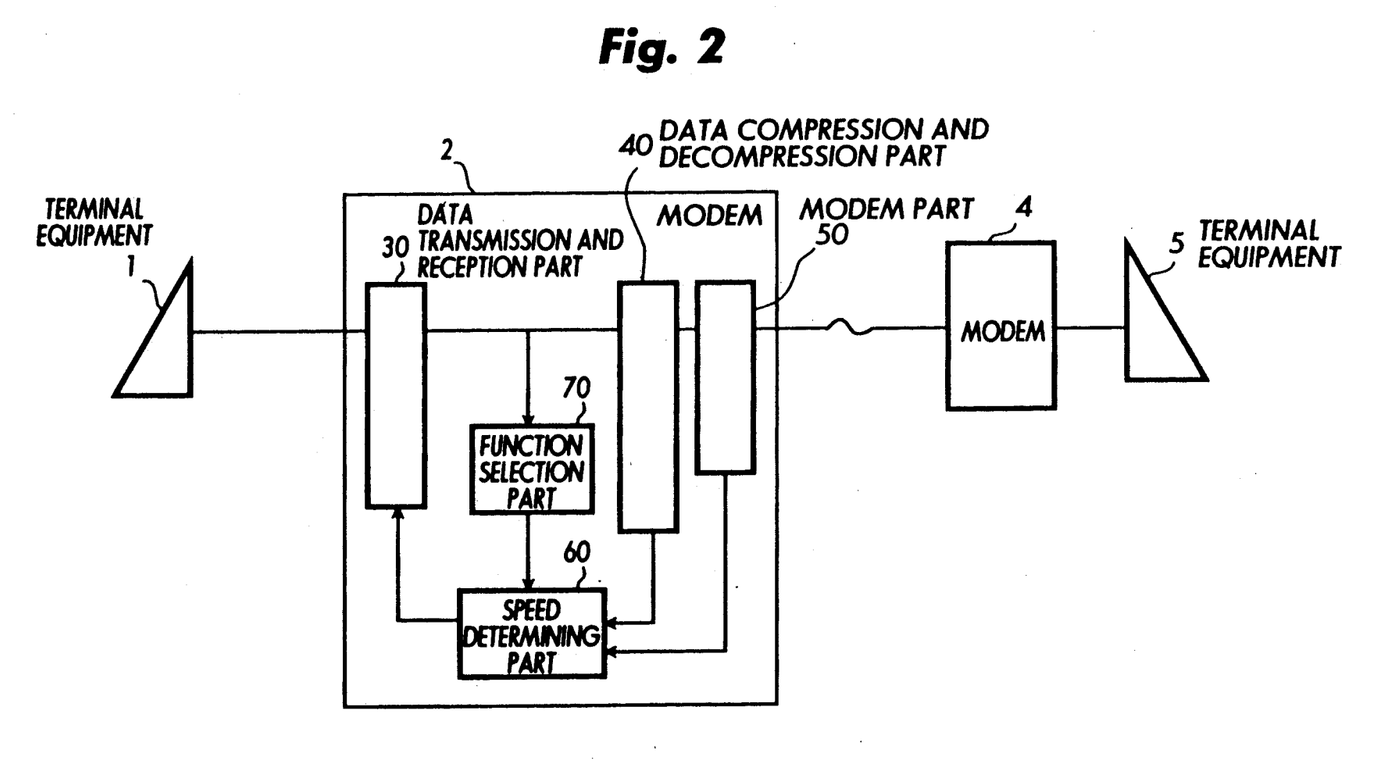
FIG. 2 is a system block diagram for explaining an operating principle of a modem according to the present invention.

First, a description will be given of an operating principle of a modem according to the present invention, by referring to FIG. 2. In FIG. 2, modems 2 and 4 are coupled via a transmission line, and a terminal equipment 1 is coupled to the modem 2 while a terminal equipment 5 is coupled to the modem 4. For the sake of convenience, only the construction of the modem 2 is shown and described because the construction of the modem 4 is the same as that of the modem 2.

When no data compression is made as a result of the exchange of the control information upon connection of the modems 2 and 4, the modem 2 notifies the terminal equipment 1 of the communication speed which is determined by the modulation technique which is used between the modems 2 and 4. On the other hand, when the data compression is made as a result of the exchange of the control information upon connection of the modems 2 and 4, the modem 2 notifies the terminal equipment 1 of the communication speed which is greater than or equal to the maximum throughput between the terminal equipments 1 and 5 determined by the data compression technique used. In addition, the communication speed on the line between the modem 2 and the terminal equipment 1 is changed to the above described communication speed which is notified to the terminal equipment 1.

The modem 2 includes a data transmission and reception part 30, a data compression and decompression part 40, a modem part 50, a speed determining part 60 and a function selection part 70. The data transmission and reception part 30 makes data transmission and reception between the modem 2 and the terminal equipment 1. The modem part 50 modulates a transmission signal with a predetermined modulation technique before transmitting the same to the modem 4, and demodulates a reception signal which is received from the modem 4. The data compression and decompression part 40 is provided between the data transmission and reception part 30 and the modem part 50. The data compression and decompression part 40 compresses the serial data from the data transmission and reception part 30 at a predetermined compression rate before supplying the same to the data transmission and reception part 30. When the connection between the modems 2 and 4 is established, the modem communication method or technique system in the modem part 50 is determined and the data compression technique of the data compression and decompression part 40 is determined, the speed determining part 60 is notified of the communication speed between the modem 2 and 4 determined from the modem technique as well as the compression rate determined from the data compression technique, and determines the optimum communication speed.

Furthermore, when the data compression is made as a result of the exchange of the control information upon connection of the modems 2 and 4, the modem 2 notifies the terminal equipment 1 of the communication speed which is greater than or equal to the maximum throughput between the terminal equipments 1 and 5 determined by the data compression technique employed, or the communication speed which is determined by the modulation technique used between the modems 2 and 4, depending on the control character from the terminal equipment 1 or hardware strap, that is, the hardware setting made by a dip switch or the like.

The functions of the parts 30, 40, 50, 60 and 70 of the modem 2 may be realized by a combination of hardware and software or solely by software.

The modem 2 is coupled to the terminal equipment 1 via the data transmission and reception part 30, and is coupled to the terminal equipment 5 via the modem part 50, the modem 4 and the transmission line. Hence, a communication can be made between the terminal equipments 1 and 5.

When the connection between the modems 2 and 4 is established, the modulation technique used between the modems 2 and 4 is determined by the modem part, 50 and the data compression technique used in each of the modems 2 and 4 is determined by the data compression and decompression part 40. Because the communication speed between the modems 2 and 4 determined by the modulation technique and the data compression rate determined by the data compression technique are notified to the speed determining part 60, the optimum communication speed which takes into account the data compression rate is determined by the speed determining part 60.

The communication speed which is determined by the speed determining part 60 is notified to the terminal equipment 1 via the data transmission and reception part 30. Then, the data transmission and reception part 30 changes the communication speed between the modem 2 and the terminal equipment 1 to the communication speed which is notified from the speed determining part 60.

If the terminal equipment 1 changes the communication speed to the communication speed notified from the modem 2 and the communication speed between the modem 4 and the terminal equipment 5 is set to an optimum communication speed which takes into account the data compression rate, the communication between the terminal equipments 1 and 5 can thereafter be made with the throughput value which effectively brings out the effects of the data compression function.

In addition, because the function selecting part 70 is provided in the modem 2, it is possible to selectively activate or deactivate the function of optimizing the communication speed depending on whether or not the data compression is made between the modems 2 and 4. Accordingly, in the case where the communication capacity of the terminal equipment 1 is limited, it is possible to prevent the communication speed from being changed to a communication speed exceeding the communication capacity of the terminal equipment 1 by optimizing the communication speed depending on whether or not the data compression is made. The setting of the function selecting part 70 may be made by &:he control character from the terminal equipment 1 or by the hardware strap, that is, the hardware setting such as the setting of the dip switch.

Figure 3:
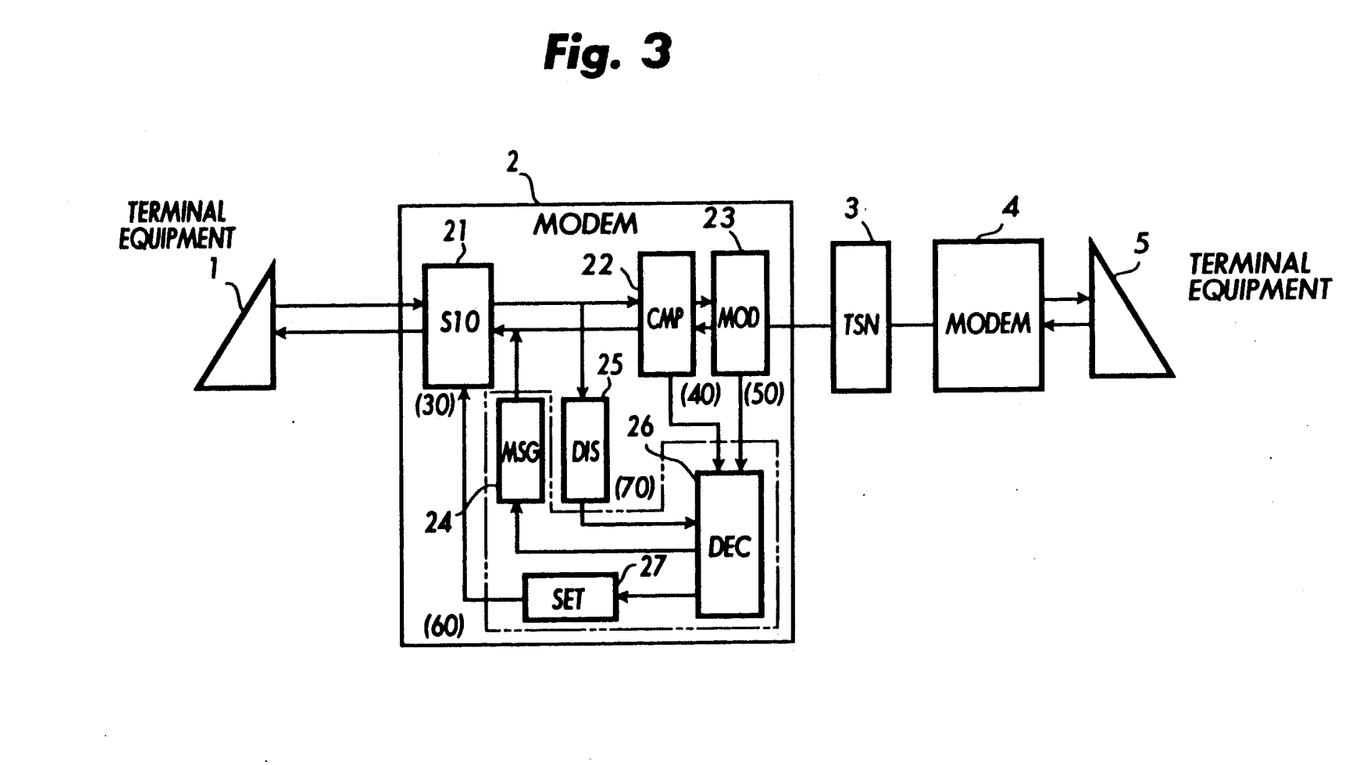
FIG. 3 is a system block diagram showing a first embodiment of the modem according to the present invention.

Next, a description will be given of a first embodiment of the modem according to the present invention, by referring to FIG. 3. In FIG. 3, those parts which are the same as those corresponding parts in FIG. 2 are designated by the same reference numerals.

In FIG. 3, the modems 2 and 4 are coupled via a telephone switching network 3, and the terminal equipment 1 is coupled to the modem 2 while the terminal equipment 5 is coupled to the modem 4. The modems 2 and 4 respectively have the data compression and decompression function as well as the modem function. Because the construction of the modem 4 is the same as that of the modem 2, only the construction of the modem 2 is shown in FIG. 3 and described hereunder.

The modem 2 shown in FIG.3 includes a data compression and decompression function as well as a modulation and demodulation function, similarly as in the case of the conventional modem 10 described above in FIG. 1. The modem 2 includes a serial input/output controller (SIO) 21, a data compression/decompression controller (CMP) 22, a modulation/demodulation controller (MOD) 23, a message controller (MSG) 24, a character distinguishability controller (DIS) 25, a data rate decision controller (DEC) 26, and a data rate setting controller (SET) 27.

Figure 4:
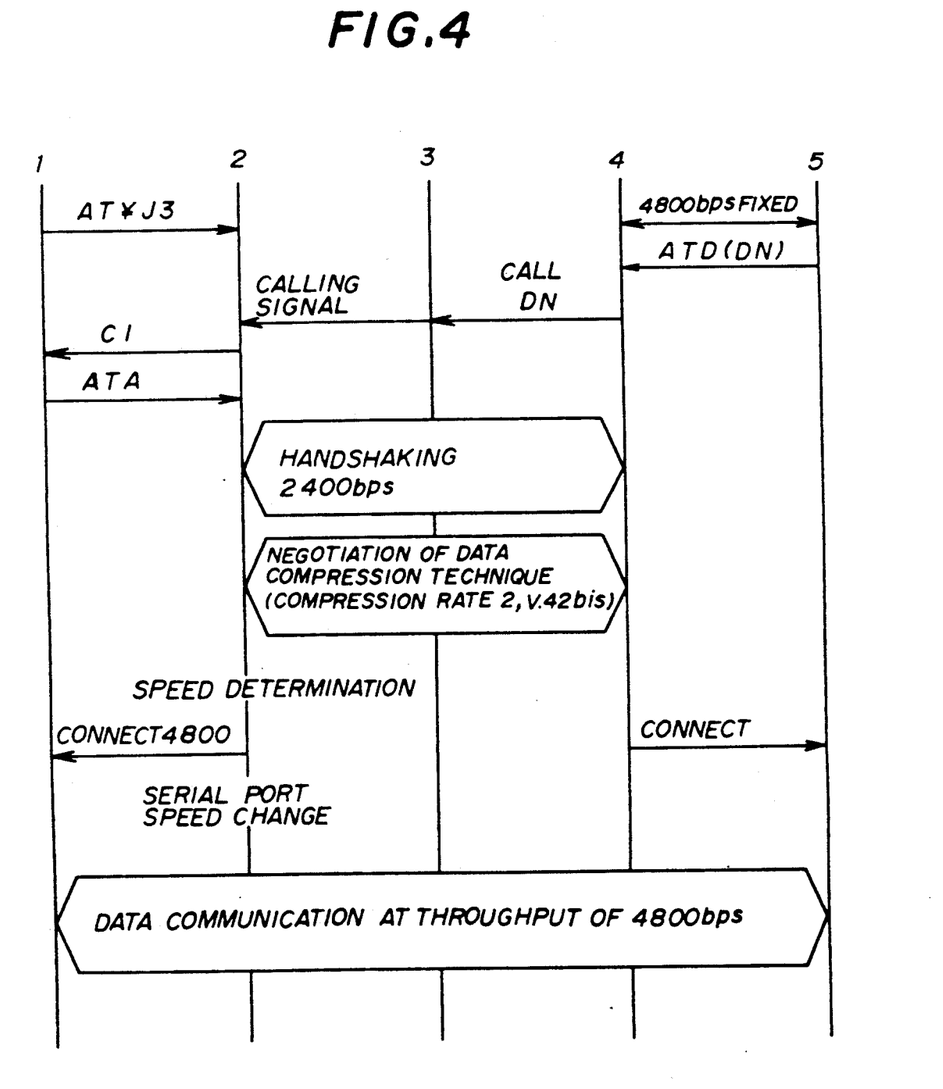
FIG. 4 is a time chart for explaining the operation of the first embodiment shown in FIG.3.

FIG.4 is a time chart for explaining the exchange of signals in the embodiment shown in FIG.3.

When a call out signal ATD (DN) including a telephone number DN assigned to the terminal equipment 1 is transmitted from the terminal equipment 5 to the modem 4 in order to connect the terminal equipments 1 and 5, the modem 4 makes a call out to the telephone switching network (TSN) 3 and sends the telephone number DN.

The TSN 3 which receives the telephone number DN selects the terminal equipment 1 by a known means and transmits a calling signal to the modem 2.

The modem 2 which receives the calling signal sends a signal having a logic value "1" to a signal line CI with a procedure in conformance with the CCITT Recommendations V.24. Hence, when an answer signal ATA is returned from the terminal equipment 1 to the modem 2, a handshaking is made between the modems 2 and 4 via the TSN 3 for determining the modulation technique based on the CCITT Recommendations V Series.

Next, a negotiation for determining the data compression technique, that is, exchange of control information, is made between the modems 2 and 4 and the data compression technique is determined. This process is in conformance with the CCITT Recommendations V.42 bis.

The MOD 23 of the modem 2 notifies the DEC 26 of the communication speed which is determined from the modulation technique used between the modems 2 and 4, and the CMp 22 notifies the DEC 26 of the data compression technique between the modems 2 and 4. In this embodiment, the above communication speed is 2400 bps and the data compression rate becomes doubled at the maximum by the above data compression technique.

Because the data compression rate is "2" in this embodiment, the DEC 26 determines or sets the serial port speed to 4800 bps and notifies or sends this communication speed to the MSG 24. The MSG 24 assembles this communication speed value in a predetermined character sequence to the terminal equipment 1, and notifies this communication speed value to the terminal equipment 1 via the SIO 21.

After the communication speed value is notified to the terminal equipment 1, the DEC 26 notifies the SET 27 of the determined communication speed. The SET 27 changes the communication speed of the SIO 21 to the notified speed.

The terminal equipment 1 makes the data communication with the modem 2 at the communication speed notified from the modem 2. Accordingly, if the communication speed between the terminal equipments 1 and 5 is 4800 bps, the communication between the terminal equipments 1 and 5 is thereafter made at the effective throughput of 4800 bps.

In addition, prior to the connection of the modems 2 and 4, it is possible to selectively activate or deactivate the function of changing the serial port speed from the speed which is determined by the modulation technique used between the modems 2 and 4 to the value which is greater than or equal to the product of the determined speed and the data compression rate by transmitting the control character from the terminal equipment 1 to the modem 2.

In other words, when the terminal equipment 1 sends a control character AT ⅄ J3 to the modem 2, the DIS of the modem 2 identifies this control character AT ⅄ J3 and instructs the DEC 26 to activate the function of changing the communication speed to the optimum communication speed when the data compression is made. In addition, this instruction to activate or deactivate the above function may be made by the hardware strap, that is, the hardware setting such as the setting of the dip switch.

This embodiment was described for the case where the terminal equipment 5 calls the terminal equipment 1, but the call may of course be made from the terminal equipment 1.

Figure 5:
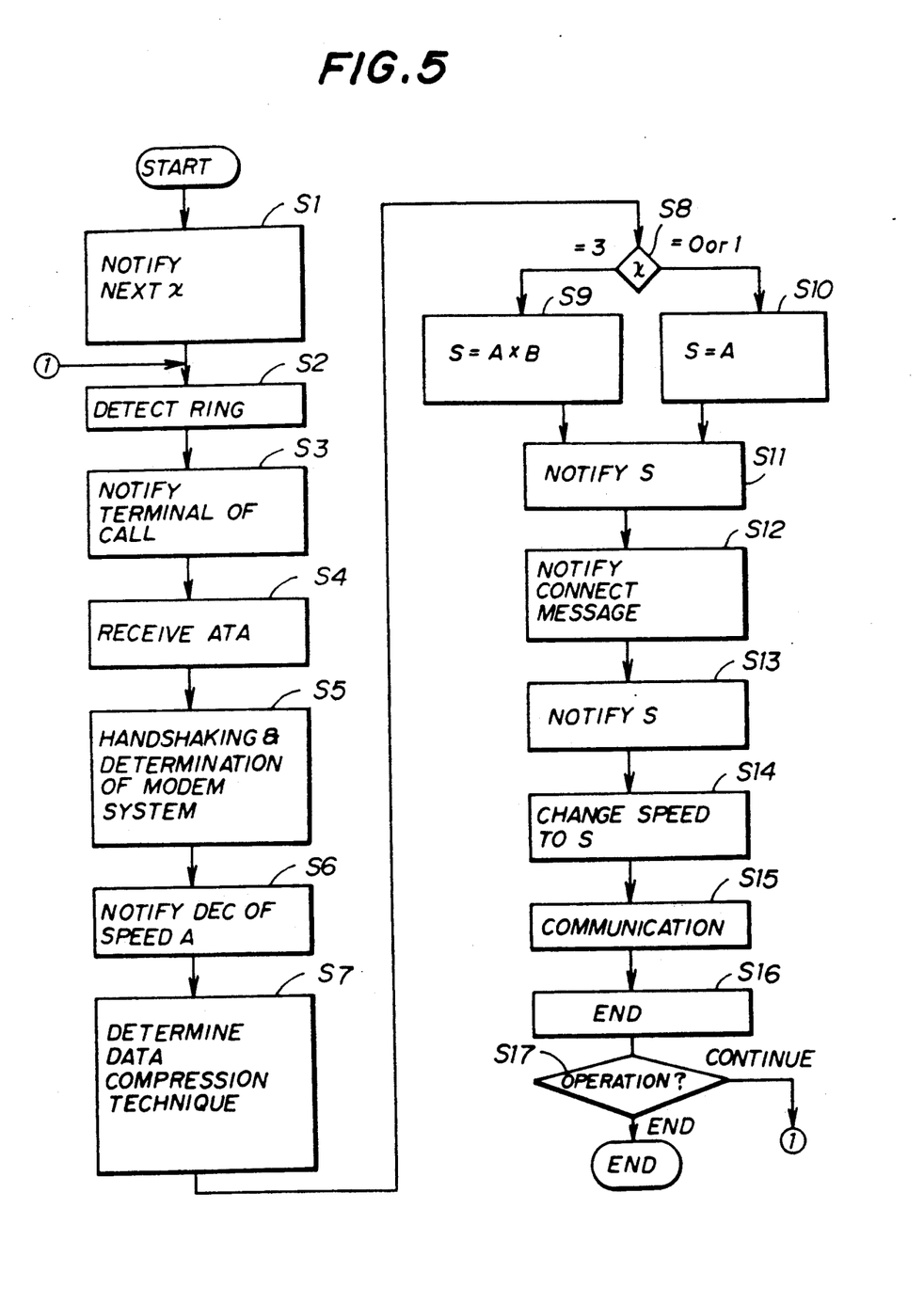
FIG. 5 is a flow chart for explaining the operation of the first embodiment shown in FIG. 3.

FIG.5 is a flow chart for explaining the operation of the embodiment shown in FIG.3 when a call is received from the TSN 3. In a step S1, the DIS 25 which receives the control information (command) AT ⅄ J3 from the terminal equipment 1 and notifies the DEC 26 of the number x next to "J". A step S2 detects the ring from the TSN 3, and a step S3 turns ON the C1 line of RS-232C and notifies the terminal 1 of the call from the TSN 3. A step S4 receives from the terminal equipment 1 the answer signal (command) ATA which indicates the call acceptance. In a step S5, the MOD 23 makes the handshaking between the modems 2 and 4 in conformance with the CCITT Recommendations V Series and determines the modulation technique used between the modems 2 and 4 including the communication speed.

In a step S6, the MOD 23 notifies the DEC 26 of the communication speed A between the modems 2 and 4. In a step S7, the CMP 22 makes the negotiation between the modems 2 and 4 related to the data compression technique and determines the data compression technique including the compression rate. Thereafter, the CMP 22 makes the data compression and decompression with the determined compression rate.

A step S8 judges whether or not the number x is "3" or is "0" or "1". When the number x is "3", the DEC 26 determines in a step S9 the communication speed S between the terminal equipment 1 and the modem 2 to S A x B. On the other hand, when the number x is "0" or "1", the DEC 26 determines in a step S10 the communication speed S between the terminal equipment 1 and the modem 2 to S=A. After the step S9 or S10, the DEC 26 notifies the MSG 24 of the communication speed S in a step S11. In a step S12, the MSG 24 assembles the message CONNECT using the communication speed S and notifies the terminal equipment 1 of this message via the SIO 21. In a step S13, the DEC 26 notifies the SET 27 of the communication speed S, and the SET 27 changes the set communication speed of the SIO 21 to the communication speed S. The communication is made in a step S15, and a step S16 disconnects the line of the TSN 3 when the communication ends. A step S17 judges whether the operation is to continue or end. The process returns to the step S2 when the operation is to continue, but the process ends when the operation is to end.

Figure 6:
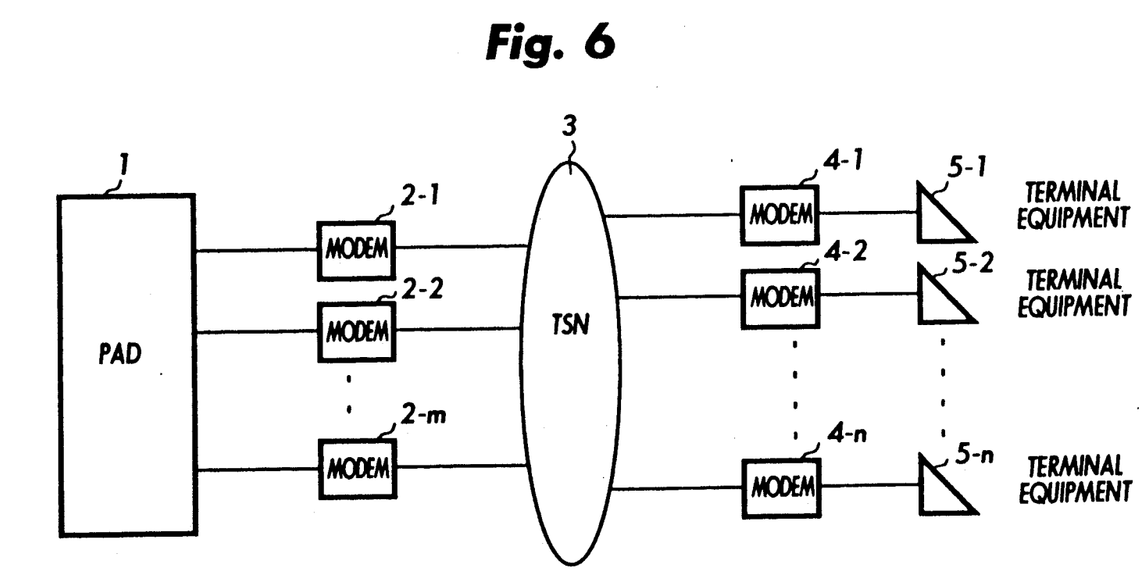
FIG. 6 is a system block diagram showing a second embodiment of the modem according to the present invention.

Next, a description will be given of a second embodiment of the modem according to the present invention, by referring to FIG.6. In FIG.6, those parts which are the same as those corresponding parts in FIG.3 are designated by the same reference numerals, and a description thereof will be omitted.

In this embodiment, the terminal equipment 1 controls a plurality of lines and is a packet assembly and disassembly (PAD) unit of a packet switching network, for example. In other words, the PAD 1 is coupled to the TSN 3 via modems 2-1 through 2-m, and the TSN 3 is coupled to terminal equipments 5-1 through 5-n via modems 4-1 through 4-n.

For example, the PAD 1 receives calls from the terminal equipments 5-1 through 5-n via the TSN 3 and simultaneously make communications with the terminal equipments 5-1 through 5-n. Particularly in the case of a personal computer communication in which the PAD 1 becomes the access point, the firmware within the PAD 1 carries out a character handling process in which the kind of character is identified every time one character is received from one of the terminal equipments 5-1 through 5-n. In this case, the number of characters received per unit time increases as the line speed between the PAD 1 and the modems 2-1 through 2-m increases, and the load of the character handling process increases. Accordingly, the number of terminal equipments with which the PAD 1 can simultaneously make communications differs depending on the line speed between the PAD 1 and the modems 2-1 through 2-m. Generally, the communications are made under the condition that the total of the line speeds between the PAD 1 and the modems 2-1 through 2-m does not exceed the maximum capacity of the character handling process of the PAD 1. For example, if the PAD 1 has 8 lines and the total capacity of the character handling process of the PAD 1 is 9600 bps and the terminal equipment 5-1 were connected to the modem 2-1 at 4800 bps and the terminal equipment 5-4 were connected to the modem 2-2 at 4800 bps, the capacity of the character handling process of the PAD 1 would totally used by the two terminal equipments 5-1 and 5-4, and it would be impossible to use the remaining 6 lines of the PAD 1 for communications with the other terminal equipments 5-2, 5-3 and 5-5 through 5-n.

But because the modems 2-1 through 2-m and the modems 4-1 through 4-n have the construction described in the first embodiment, it is possible to set the line speed between the PAD 1 and the modems 2-1 through 2-m to an optimum speed such that the data compression function of the modems 2-1 through 2-m are effectively utilized without applying unnecessary load on the PAD 1. For example, in the case where the line speed between the modem 2-1 and the modem 4-1 is 1200 bps, the line speed between the PAD 1 and the modem 2-1 is set to 1200 bps when no data compression is made and to 2400 bps when the data compression is made in the modem 2-1.

But on the other hand, if the conventional modems shown in FIG. 1 are used in the system shown in FIG. 6, it is impossible to effectively utilize the capacity of the character handling process of the PAD 1. That is, if the line speed between two modems 10 and 20 in FIG. 1 is 1200 bps and the compression rate of 2 is to be effectively utilized, the line speed between the PAD and the modem 10 must be fixed to 2400 bps prior to the communication. In addition, if the maximum capacity of the character handling process of the PAD is 9600 bps and all of the terminal equipments 5 are connected to the modems 20 at 1200 bps without the data compression, it is possible to connect a maximum of 8 terminal equipments 5 when the line speed between the PAD and the modem 10 is 1200 bps but only 4 terminal equipments 5 can be connected and half the capacity of the character handling process of the PAD will be wasted when the line speed between the PAD and the modem 10 is fixed to 2400 bps. Therefore, the superior effects of the second embodiment are evident when compared to the conventional system.

Further, the present invention is not limited to these embodiments, but various variations and modifications may be made without departing from the scope of the present invention.

What is claimed is:

1. A modem which is connectable to terminal equipment and for communicating with an other modem via a transmission line, the other modem connectable to other terminal equipment, said modem comprising:
    data transmission and reception means connectable to the terminal equipment for performing data transmission and reception with the terminal equipment using a transmission signal;
    modem means, connectable to the transmission line, for determining a modulation technique used between said modem and the other modem by handsaking, for modulating the transmission signal using the modulation technique producing a modulated transmission signal, for transmitting the modulated transmission signal to the other modem, for demodulating a modulated reception signal which is received from the other modem and for outputting a reception signal and a communication speed determined from the modulation technique;
    data compression and decompression means, coupled between said data transmission and reception means and said modem means, for determining a compression technique used between said modem and the other modem by negotiation, for compressing data from said data transmission and reception means at a compression rate determined from the compression technique, for supplying the transmission signal received from said data transmission and reception means to said modem means, for decompressing the reception signal received from said modem means forming decompressed data, for supplying the decompressed data to said data transmission and reception means and for outputting the compression rata; and
    speed determining means, coupled to said modem means, said data compression and decompression means and said data transmission and reception means, for determining an optimum communication speed between said modem and the terminal equipment in response to the communication speed output from said modem means and the compression rata output from said data compression and decompression means, the optimum communication speed being determined when a communication between said modem and the other modem is established, and when the modulation and the data compression techniques are determined and said speed determining means for notifying the data transmission and reception means of the optimum communication speed, and
    said data transmission and reception means changing a speed of the data transmission and reception with the terminal equipment producing a data communication between the terminal equipment and the other terminal equipment using the optimum communication speed.

2. The modem as claimed in claim 1, wherein said data transmission and reception means performs the data transmission and reception with the terminal equipment using the optimum communication speed which is determined based on the communication speed between said modem and the other modem when no data compression is performed in said data compression and decompression means.

3. The modem as claimed in claim 1, wherein said data transmission and reception means performs the data transmission and reception with the terminal equipment using the optimum communication speed which is determined based on the data compression rate producing the optimum communication speed being greater than or equal to a maximum throughput between said terminal equipment and the other terminal equipment when data compression is performed in said data compression and decompression means.

4. The modem as claimed in claim 1,
wherein said speed determining means operates at a mode comprising first and second modes, and
said modem further comprises selecting means coupled to said data transmission and reception means and said data compression and decompression means for selecting the mode of said speed determining means as one of the first and second modes,
said speed determining means in the first mode notifying the data transmission and reception means of the optimum communication speed which is determined based on the communication speed between said modem and the other modem when either no data compression is performed or when data compression is performed in said data compression and compression means, and
said speed determining means in the second mode notifying the data transmission and reception means of the optimum communication speed which is determined based on the data compression rate, producing the optimum communication speed being greater than or equal to a maximum throughput between said terminal equipment and the other terminal equipment when the data compression is performed in said data compression and decompression means.

5. The modem as claimed in claim 1, wherein the transmission line is a telephone switching network which is connected to a plurality of modems, and the terminal equipment is connected to the plurality of modems.

6. The modem as claimed in claim 4, wherein said selecting means selects the one of the first and second modes in response to a control character received from the terminal equipment.

7. The modem as claimed in claim 4, wherein said selecting means selects the one of the first and second modes in response to a manipulation of a switch.

8. A speed adapter apparatus for changing a communication speed of a communication having compressed data between a modem and terminal equipment based on a compressed communication between the modem and an other modem, said speed adapter apparatus comprising:
detecting means for detecting a modem communication speed and a compression rate used between the modem and the other modem;
speed determining means for determining an optimum communication speed based on the modem communication speed and the compression rate received from said detecting means; and
speed setting means for setting the communication speed used between the modem and the terminal equipment to the optimum communication speed received from said speed determining means.

* * * * *

UNITED STATES PATENT AND TRADEMARK OFFICE
CERTIFICATE OF CORRECTION

PATENT NO. : 5,182,762

DATED : January 26, 1993

INVENTOR(S) : Shirai et al.

It is certified that error appears in the above-identified patent and that said Letters Patent is hereby corrected as shown below:

Col. 5,   line 30, after "the" insert --modem part 50, and decompresses the compressed serial data from the modem part 50 before supplying the same to the--.

Col. 6,   line 37, "&:he" should be --the--;
          line 59, "(S1O) should be --(SIO)--.

Col. 7,   line 26, "CMp" should be --CMP--.

Col. 8,   line 13, "C1" should be --CI--.
          line 34, after "S" insert -- = --.

Col. 10,  line 34, "rata" should be --rate--;
          line 42, "rata" should be --rate--.

Col. 11,  line 22, "compression" should be --decompression--.

Signed and Sealed this

Thirtieth Day of November, 1993

Attest:

BRUCE LEHMAN

*Attesting Officer*   Commissioner of Patents and Trademarks